US010477187B2

United States Patent
Emberger et al.

(10) Patent No.: US 10,477,187 B2
(45) Date of Patent: Nov. 12, 2019

(54) METHOD OF CONSTRUCTING A DEPTH MAP OF A SCENE AND/OR A FULLY FOCUSED IMAGE

(71) Applicant: Commissariat à l'Energie Atomique et aux Energies Alternatives, Paris (FR)

(72) Inventors: Simon Emberger, Grenoble (FR); William Guicquero, Bures sur Yvette (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 0 days.

(21) Appl. No.: 15/721,937

(22) Filed: Oct. 1, 2017

(65) Prior Publication Data

US 2018/0098051 A1 Apr. 5, 2018

(30) Foreign Application Priority Data

Oct. 3, 2016 (FR) ...................... 16 59497

(51) Int. Cl.
*G06K 9/40* (2006.01)
*H04N 13/271* (2018.01)
*G06T 7/571* (2017.01)
*H04N 13/236* (2018.01)
*G06K 9/00* (2006.01)
(Continued)

(52) U.S. Cl.
CPC ....... *H04N 13/271* (2018.05); *G06K 9/00134* (2013.01); *G06T 5/003* (2013.01); *G06T 5/50* (2013.01); *G06T 7/571* (2017.01); *H04N 5/2356* (2013.01); *H04N 13/236* (2018.05);
(Continued)

(58) Field of Classification Search
CPC .. H04N 13/271; H04N 5/2356; H04N 13/236; G06T 5/003; G06T 7/571; G06T 5/50; G06T 2207/20221; G06T 2207/10148; G06K 9/00134
See application file for complete search history.

(56) References Cited

U.S. PATENT DOCUMENTS 9,307,221 B1* 4/2016 Tang ................... H04N 5/23222
9,749,532 B1* 8/2017 Hinkel ................. G02B 27/646
(Continued)

OTHER PUBLICATIONS

Preliminary Search Report in French Patent Application No. 1659497 dated May 15, 2017, 1 page.
(Continued)

*Primary Examiner* — Samir A Ahmed
(74) *Attorney, Agent, or Firm* — Moreno IP Law LLC (57) ABSTRACT

A method of generating, by means of a processing device, a depth map and/or a fully focused image of a scene, from a series of images of the scene taken under a same viewing angle but with a different focusing, the method including the steps of:
a) for each position of a pixel in the series of images, searching for an extremum of the pixel value in the series of images; and
b1) assigning to said pixel position a depth value which is a function of the rank, in the series of images, of the image where the extremum has been identified at step a) to construct a depth map of the scene, and/or
b2) assigning to said pixel position the value of the extremum identified at step a) to construct a fully focused image of the scene.

21 Claims, 3 Drawing Sheets

(51) Int. Cl.
*G06T 5/50* (2006.01)
*G06T 5/00* (2006.01)
*H04N 5/235* (2006.01)

(52) U.S. Cl.
CPC .............. *G06T 2207/10148* (2013.01); *G06T 2207/20221* (2013.01)

(56) References Cited

U.S. PATENT DOCUMENTS

| | | | | |
|---|---|---|---|---|
| 9,787,899 | B1* | 10/2017 | Hinkel | ............... H04N 5/23254 |
| 2012/0070097 | A1* | 3/2012 | Adams, Jr. | ......... H04N 5/23212 |
| | | | | 382/255 |
| 2014/0044314 | A1* | 2/2014 | Sezer | ...................... G06T 7/571 |
| | | | | 382/106 |
| 2017/0206642 | A1* | 7/2017 | Rhead | ....................... G06T 5/50 |

OTHER PUBLICATIONS

Kaneko, Takashi et al.; "A New Smart Vision System Using a Quick Response Dynamic Focusing Lens"; IEEE; Jan. 23, 2000.
Fujiwara, Hisanaga; "Passive Range Sensor Using Multi-Focus Images"; Intelligent Robots and Systems '96, IROS 96, Proceedings of the 1996 L EEE/RSJ International Conference on Osaka, Japan; vol. 1; Nov. 4, 1996.

\* cited by examiner

METHOD OF CONSTRUCTING A DEPTH MAP OF A SCENE AND/OR A FULLY FOCUSED IMAGE

This application claims the priority benefit of French patent application number 16/59497, the content of which is hereby incorporated by reference in its entirety to the maximum extent allowable by law.

BACKGROUND

The present disclosure generally relates to imaging systems, and more particularly relates to the acquisition of three-dimensional images (3D images), that is, images where, for each pixel of the image, a value relative to the distance between the photographed scene and the acquisition device is available. The set of values relative to the distance between the photographed scene and the acquisition device defines a depth map of the scene. The present disclosure more particularly relates to a method of constructing a depth map of a scene and to a device capable of implementing this method. The present disclosure also relates to the acquisition of a fully focused image of a scene.

DISCUSSION OF THE RELATED ART

Various methods of acquisition of 3D images have been provided. Among such methods, one may in particular mention:

stereovision acquisition methods, where a plurality of two-dimensional (2D) images of a same scene, taken under different viewing angles, are used to construct a 3D image;

time-of-flight measurement acquisition methods, where the scene is illuminated by a pulsed light source, and a fast image sensor, synchronized with the light source, measures, for each pixel, the travel time of light between the light source and the scene;

light fall-off measurement acquisition methods, where a plurality of 2D images of a same scene, taken under the same viewing angle but in different illumination conditions, are used to construct a 3D image;

structured illumination acquisition methods, where the scene is illuminated with a specific predefined illumination pattern (for example, a grid pattern), and depth information is determined from the deformations of the illumination pattern by the scene; and blurring or clearness analysis acquisition methods, where a plurality of 2D images of a same scene, taken under the same viewing angle but with a different focusing, are used to construct, by local or partially local analysis, a 3D image.

Methods of 3D analysis by blurring or sharpness analysis are here more particularly considered. An advantage of such methods indeed is that the acquisition of the 2D images used as a basis for the construction of a 3D image is relatively simple to implement, since it does not require modifying the viewing angle of the acquisition device between two successive shootings. Further, it is a passive acquisition, since it is not necessary to project a specific illumination on the scene.

Methods of construction of 3D images by blurring or sharpness analysis are based on the fact that a 2D image acquisition device, comprising an image sensor and an optical system (or lens) placed opposite this sensor, has a limited depth of field. Thus, when the device is focused onto a specific area of the scene, closer or more remote areas of the scene may form a blurred image on the sensor. Measuring the blurring or sharpness level may thus enable to determine information relative to the distance between the scene and the acquisition device.

A disadvantage of known methods of map construction by blurring or sharpness analysis is their high computational complexity. Indeed, the measurement of the blurring or sharpness level in each image or image portion is generally based on relatively complex convolution operations.

It would be desirable to have a method of constructing a depth map of a scene from a series of images of the scene taken under the same viewing angle but with a different focusing, such a method having a lower computational complexity than known methods.

It would further be desirable to have a method enabling to construct a fully focused image of a scene.

It would further be desirable to have a method enabling to provide a relevance estimator to simplify and/or to improve the efficiency of an advanced processing for improving a fully focused image or a depth map, and of data interpretation.

It should in particular be noted that the article entitled "A New Smart Vision System Using A Quick-Response Dynamic Focusing Lens" of Takashi Kaneko et al. describes a method of constructing a fully focused image or a depth map, but does not describe supplying, for each pixel, in addition to the focused value or to the depth value assigned to the pixel, an output value representative of the likelihood of the value assigned to the pixel.

SUMMARY

Thus, an embodiment provides a method of generating, by means of a signal processing device, a depth map and/or a fully focused image of a scene, from a series of images of the scene, each comprising a same number of pixels, the images being taken under a same viewing angle but with a different focusing, the method comprising, for each position of a pixel in the series of images, the steps of:

a) searching for an extremum of the pixel value or of a derivative of the pixel value in the series of images by only taking into account the values of the pixel at the considered position in the series of images;

b) assigning to said position of a pixel:

a first value which is a function of the rank, in the series of images, of the image where the extremum has been identified at step a) to construct a depth map of the scene, and/or a second value equal to the value of the pixel in the image where the extremum has been identified at step a) to construct a fully focused image of the scene;

c) assigning to said position of a pixel a third value representative of the relevance of the first and/or second value assigned to the pixel at step b), the third value being determined by only taking into account the values of the considered pixel in the series of images; and d) supplying output data comprising the first and/or the second value, and the third value assigned to the pixel.

According to an embodiment, the third value is representative of the dynamic range of the variation of the value of the pixel in the series of images.

According to an embodiment, the third value is equal to the difference between the maximum value and the minimum value of the pixel in the series of images.

According to an embodiment, the third value is representative of the dynamic range of a local variation of the value of the pixel in the series of images.

According to an embodiment, at step a), the search for an extremum is carried out by comparing two by two the values of the pixel in the consecutive images of the series of images.

According to an embodiment, at step a), the search for an extremum is carried out by searching for a sign change of the derivative of the value of the pixel in the series of images.

Another embodiment provides a signal processing device capable of implementing a method of generating a depth map and/or a fully focused image of a scene such as defined hereabove.

Another embodiment provides a system comprising:

an acquisition device comprising an image sensor, an optical system placed opposite the sensor, and a control circuit capable of controlling the acquisition of a series of images by the sensor by modifying on each acquisition a focus adjustment of the acquisition device; and a signal processing device such as defined hereabove, configured to generate a depth map and/or a fully focused image of a scene seen by the sensor from the series of images acquired by the acquisition device.

According to an embodiment, the processing device comprises, for each pixel, a processing circuit capable of identifying an extremum of the output value of the pixel from a series of successive output values supplied by the pixel.

According to an embodiment, each processing circuit is capable of processing on the fly the output values of the pixel associated therewith.

According to an embodiment, each processing circuit is integrated in the pixel associated therewith.

The foregoing and other features and advantages will be discussed in detail in the following non-limiting description of specific embodiments in connection with the accompanying drawings.

DETAILED DESCRIPTION OF THE PRESENT EMBODIMENTS

The same elements have been designated with the same reference numerals in the different drawings and, further, the various drawings are not to scale. For clarity, only those elements which are useful to the understanding of the described embodiments have been shown and are detailed. In particular, the uses that may be made of a depth map of a scene have not been detailed, the described embodiments being compatible with known applications capable of using a depth map of a scene. In the present disclosure, unless otherwise specified, expressions "approximately", "substantially", and "in the order of" mean to within 10%, preferably to within 5%.

Figure 1:
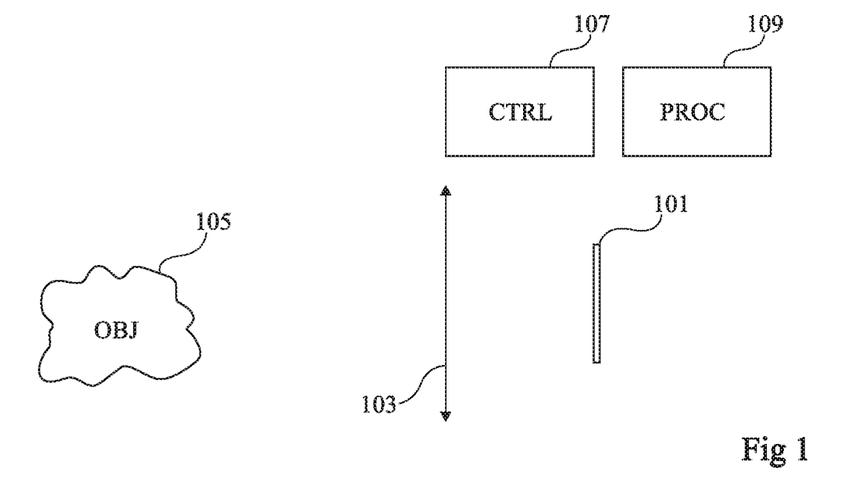
FIG. 1 is a simplified diagram of an example of an image acquisition system according to an embodiment.

FIG. 1 is a simplified diagram of an example of an image acquisition system according to an embodiment.

The system of FIG. 1 comprises an image sensor 101, for example, a CMOS sensor. Sensor 101 comprises a plurality of pixels (not detailed in FIG. 1), for example arranged in an array of rows and columns. In a 2D image acquisition phase, each pixel is capable of supplying an output value representative of the illumination level that it receives during an integration period. The set of pixel output values forms a 2D image of a scene seen by the sensor. As an example, each pixel of sensor 101 comprises a photodiode and one or a plurality of control transistors.

The system of FIG. 1 further comprises an optical system 103 or lens, intended to be placed between sensor 101 and a scene 105 (OBJ), an image of which is desired to be acquired. Optical system 103 for example comprises one or a plurality of lenses. Optical system 103 is capable of focusing onto sensor 101 the light originating from scene 105.

In the system of FIG. 1, the focusing of the acquisition device comprising sensor 101 and optical system 103 is configurable. In other words, the distance between optical system 103 and sensor 101 and/or the focal distance of optical system 103 may be modified to enable, without displacing the acquisition device, to modify the sharpness of scene 105 projected on sensor 101. The focusing of the acquisition device comprising sensor 101 and optical system 103 is for example manually configurable. However, in a preferred embodiment, the focusing of the acquisition device is electrically configurable.

The system of FIG. 1 further comprises a control circuit 107 (CTRL) capable, during a phase of acquisition of a 3D image, of controlling the acquisition device comprising sensor 101 and optical system 103 so that it successively acquires a series of n 2D images of scene 105, where n is an integer greater than 1, for example, a series of from 5 to 50 successive images, by modifying the focusing for each acquisition. The variation of the focusing applied to the device during the acquisition of the series of 2D images is preferably a monotonous variation. In other words, the applied focusing variation is preferably such that the distance between the acquisition device and the plane of scene 105 appearing the sharpest in the image projected on sensor 101 increases monotonously or decreases monotonously between the first and the last acquisition. If the focusing variation applied to the acquisition device is not monotonous, the 2D images of the series of images may for example be put back in order during a subsequence phase of construction of a depth map of the scene.

Preferably, optical system 103 comprises an adjustable lens, that is, a fixed lens having a focal distance which may be varied by electric control. In this case, the focusing of the acquisition device by circuit 107 is controlled by controlling the variations of the focal distance of the adjustable lens. The adjustable lens is for example a liquid lens, or a liquid crystal lens. The use of an adjustable lens to control the focusing of the acquisition device has the advantage of limiting zoom focusing effects, that is, scale variations between the different 2D images, due to the focusing differences of the device during the acquisition of these images. The described embodiments are however not limited to the use of an adjustable lens. It should in particular be noted that if there exist magnifying and/or alignment and/or general luminosity differences between the different 2D images of the series of images, the subsequent phase of construction of a depth map of the scene from the series of acquired 2D images may comprise a previous step of correcting the artifacts due to the acquisition comprising a rescaling and/or a realignment and/or a general luminosity readjustment of the different 2D images.

The system of FIG. 1 further comprises a processing circuit 109 (PROC) capable of receiving the series of 2D images acquired by the sensor, and of constructing, from these images, a depth map of the scene, that is, of determining, for each pixel, information relative to the distance between the acquisition device and the scene, and/or capable of constructing, from these images, a fully focused image of the scene. As will be explained in further detail hereafter, processing circuit 109 may be external to sensor 101, or may be totally or partially integrated in sensor 101.

Figure 2:
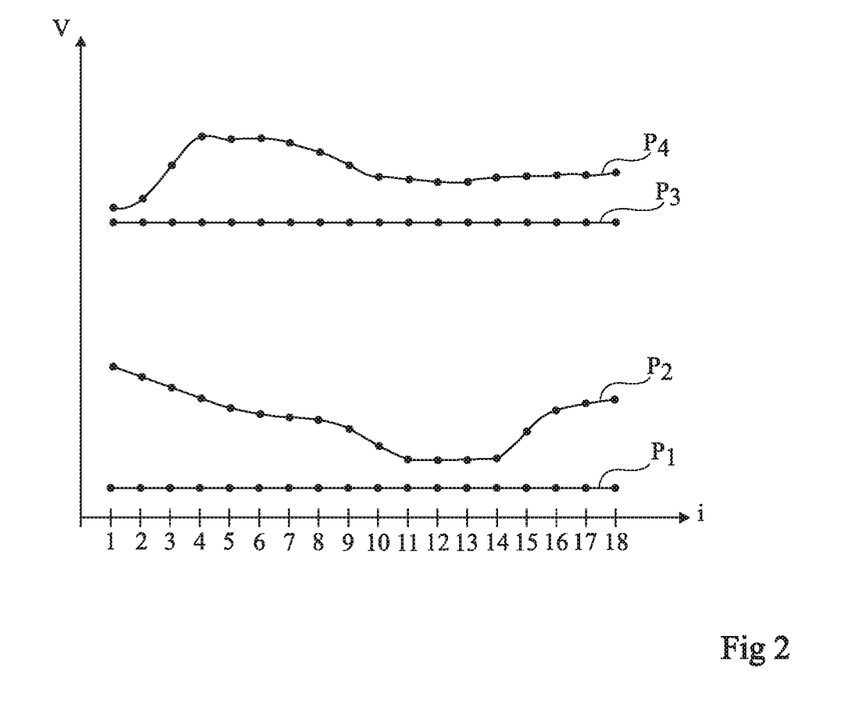
FIG. 2 is a diagram illustrating an operating principle of the system of FIG. 1.

FIG. 2 is a diagram illustrating an operating principle of the system of FIG. 1. More particularly, FIG. 2 shows, for four different pixels $P_1$, $P_2$, $P_3$, $P_4$ of sensor 101, the value of the pixel in each of the n 2D images acquired by sensor 101 for the construction of a depth map and/or of a fully focused image. In the diagram of FIG. 2, the axis of abscissas represents rank i of the images in the series of 2D images acquired by the sensor, i being an integer in the range from 1 to n, and the axis of ordinates represents value V of the pixels in the corresponding images. In the shown example, the series of 2D images acquired for the construction of a depth map and/or of a fully focused image comprises n=18 images. In this example, the focusing variation applied to the acquisition device between the acquisition of the image of rank i=1 and the acquisition of the image of rank i=18 is considered as monotonous. Further, it is considered herein that the images of ranks i=1 to i=18 are substantially at the same scale and are substantially aligned.

As appears in FIG. 2, the values of pixels $P_1$ and $P_3$ are substantially constant in the series of 18 images acquired by sensor 101. Pixels $P_1$ and $P_3$ typically correspond to pixels located opposite uniform areas of the scene, for which the modification of the focusing of the acquisition device does not result in a significant modification of the light intensity received by the pixel.

Conversely, the values of pixels $P_2$ and $P_4$ vary significantly between the different images. Pixels $P_2$ and $P_4$ typically correspond to pixels located opposite edges or contours of the image, or opposite neighboring areas of edges or contours of the image, for which the modification of the focusing of the acquisition device results in a significant modification of the light intensity received by the pixel.

It can further be observed that in the series of images acquired by sensor 101, the values of pixels $P_2$ and $P_4$ each cross an extremum. More particularly, the value of pixel $P_2$ crosses a minimum in the image of rank i=11, and the value of pixel $P_4$ crosses a maximum in the image of rank i=4. The image where the output value of a pixel $P_j$, j being an integer representing the index or the position of the pixel in the sensor, crosses an extremum, corresponds to the image for which the point in the scene located opposite pixel $P_j$ is the sharpest. For a given position of pixel $P_j$, the rank of the image for which the pixel value crosses an extremum is thus representative of the distance between the acquisition device and the corresponding point in the scene. As an illustration, in the example of FIG. 2, considering that the focusing variation applied to the acquisition device is such that the distance between the acquisition device and the plane of scene 105 appearing the sharpest in the image projected on sensor 101 increases monotonously between the first (rank i=1) and the last (i=18) acquisition, it can be deduced from the diagram of FIG. 2 that the point of the scene seen by pixel $P_4$ is closer to the acquisition device than the point of the scene seen by pixel $P_2$.

According to an aspect of an embodiment, to construct a depth map of a scene from a series of 2D images of the scene acquired by sensor 101, it is provided to search, for each position of the pixel in the series of images, for an extremum of the pixel value, and to assign to the pixel a depth value which is a function of the rank of the image where the extremum has been detected. The set of depth values assigned to the pixels forms a depth map of the scene.

As a variation, in addition to the depth value, for each pixel, a likelihood estimator for example capable of being used by the final application in order to weight, refine or denoise the depth value assigned to the pixel, may be stored. As an example, the likelihood estimator is a function of the dynamic range of the variation of the pixel value in the series of 2D images. For example, the likelihood estimator is equal to the difference between the maximum value and the minimum value of the pixel in the series of 2D images acquired by the sensor. Thus, in the example of FIG. 2, the likelihood estimators assigned to pixels $P_1$ and $P_2$ will be relatively low as compared with the likelihood estimators assigned to pixels $P_2$ and $P_4$. Indeed, the relevance of the depth estimation obtained by the provided method is lower in uniform areas of the scene than in high-contrast areas. As a variation, the likelihood estimator is a function of the dynamic range of a local variation of the pixel value in the series of 2D images, that is, of the dynamic range of a local variation of the pixel value on the curves of FIG. 2. The set of depth estimators assigned to the pixels forms a likelihood map of the scene.

For each pixel position, the value of the extremum of the pixel may further be stored to construct an image said to be fully focused, that is, where, for each pixel, the selected value of the pixel is that of the image where the pixel is the sharpest.

As a variation, for certain applications, only the fully focused image is of interest. In this case, it may be provided to only store the value of the extremum of each pixel to construct a fully focused image of the scene, rather than depth values or likelihood estimators.

As a variation, for certain applications, it may be provided to only keep the fully focused image and the likelihood map, rather than the depth map, that is, to only keep the value of the extremum and the likelihood estimator of each pixel.

The likelihood map may for example be used in a subsequent processing to determine, for each pixel, whether the depth value and/or the focused value determined for the pixel are sufficiently reliable.

As an example, the likelihood map may be used to detect contours in the image, the likelihood estimators being in principle greater at the contour level than in uniform areas of the image. To improve the contour detection, various filtering operations may for example be applied to the likelihood map. For example, a method of post-processing the likelihood map comprising a first high-pass filtering step, followed by a local smoothing and then by an extraction of the pixels corresponding to the local maximum values of the likelihood map. To decrease the impact of noise, the processing may for example be carried out on a previously sub-sampled image resulting from the selection—by block—of the pixels having the highest likelihood value. Once the contour map has been extracted, it may for example be decided to only consider the depth values corresponding to the image contours.

Another example of a method of post-processing the acquired data may be to propagate from close to close the more relevant depth values, taking the likelihood map and, possibly, the fully focused image, into account. To achieve this, the following steps may for example be implemented for each pixel:

define a group of pixels neighboring the considered pixel;

for each pixel in the group of neighboring pixels, calculate an indicator representative of the probability for the depth value of the pixel to be more relevant than that of the other pixels in the group, for example, by only taking into account the likelihood values of the pixels in the group, or by taking into account the likelihood values and the focused values of the pixels in the group and, possibly, the distance to the central pixel of the group; and assigning to the considered pixel the depth value and the likelihood value of the pixel in the group having the greatest likelihood of having the most relevant depth value.

These three steps may advantageously be implemented iteratively a plurality of times. For example, the three above-mentioned steps may be repeated in a loop until a previously-defined stop criterion is reached.

Another example of a method of post-processing the acquired data may comprise implementing a regularization based on the cosparsity between the fully focused image and the depth map, using the likelihood map. This method for example comprises an initial step of determining a binary mask M defining the positions of the relevant pixels. As an example, the pixels selected in mask M mainly are the pixels corresponding to contours of the image, identified from the likelihood map. To perform this regularization operation, two cost functions respectively called fidelity term and regularization function may for example be defined. The relative influence of each portion of this objective function may be weighted by a scalar named regularization parameter and noted λ. The regularization function may advantageously use the cosparsity (or joint sparsity) of the depth values and of the focused values while the fidelity term enables to estimate the distance between the initial depth measurements and the regularization result for the pixels selected by mask M. An algorithm which is robust towards errors or anomalies of the extracted depth values may for example take the following form:

Calculate the initial mask M determining the considered depth values by means of the likelihood map.

Carry out a regularization of parameter λ of the depth values and update them.

Detect outliers of the updated depth values, for example, by means of a median filter, and remove the corresponding positions of the considered mask M.

Update regularization parameter λ.

These four steps may advantageously be implemented iteratively a plurality of times. For example, the three above-mentioned steps may be repeated in a loop until a previously-defined stop criterion is reached.

Figure 3:
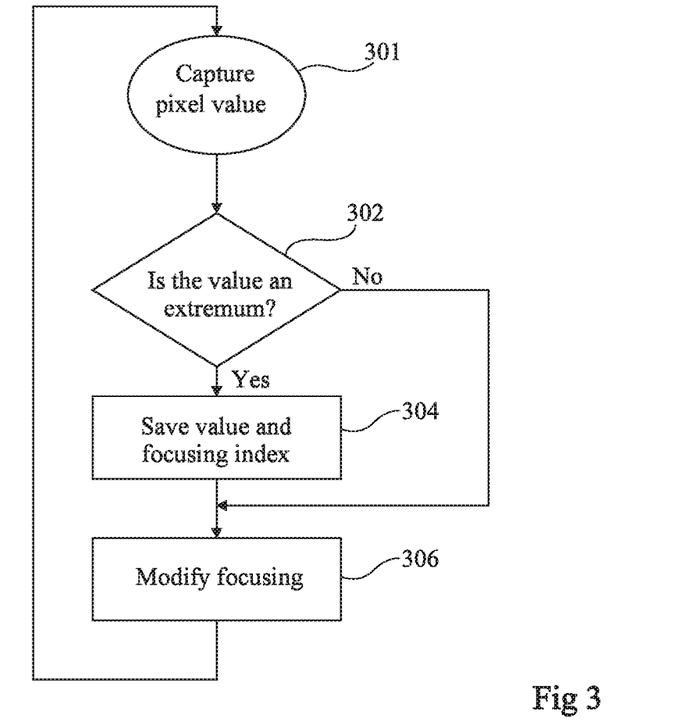
FIG. 3 is a block diagram illustrating an example of a method of constructing a depth map of a scene and/or a fully focused image of the scene according to an embodiment.

FIG. 3 is a block diagram illustrating an example of a method of constructing a depth map of a scene and/or a fully focused image of the scene, based on the principles discussed in relation with FIGS. 1 and 2. FIG. 3 more particularly shows a method of acquiring a depth value and/or a focused value for a given pixel $P_j$ of sensor 101 of FIG. 1. This same method may however be implemented in parallel, for example, simultaneously, for all the sensor pixels.

At a step 301 ("Capture pixel value"), the sensor supplies an output value of pixel $P_j$, representative of the illumination level received by the pixel during an integration phase. During this step, the focusing of the acquisition device is set to a first state.

At a step 302 ("Is the value an extremum?") subsequent to step 301, processing circuit 109 (FIG. 1) determines whether the value acquired at step 301 is an extremum among the series of values already acquired for this pixel.

If, at step 302, processing circuit 109 determines that the pixel value is an extremum, then the pixel value and the rank of the corresponding acquisition are saved at a step 304 ("Save value and focusing index"). As a variation, if it is only desired to construct a fully focused image rather than a depth map, the rank of the acquisition may not be saved at step 304.

At a step 306 ("Modify focusing") subsequent to step 304, the adjustment of the device focusing is modified, for example, via control circuit 107 (FIG. 1), after which steps 301 to 306 are repeated.

If, at step 302, processing circuit 109 determines that the pixel value is not an extremum, then step 304 is omitted and step 306 is directly implemented.

After a predefined number n of iterations of steps 301 to 306, the last extremum value saved for the pixel and, possibly, the corresponding acquisition rank, may be used to respectively construct a fully focused image and a depth map of the scene.

The search for an extremum implemented at step 302 may be carried out by comparing two by two the consecutive values of the series of pixel output values. As a variation, the search for an extremum may be carried out by searching for a sign change of the derivative of the series of pixel output values. More generally, any known method of searching for an extremum from a series of values may be used.

Figure 4:
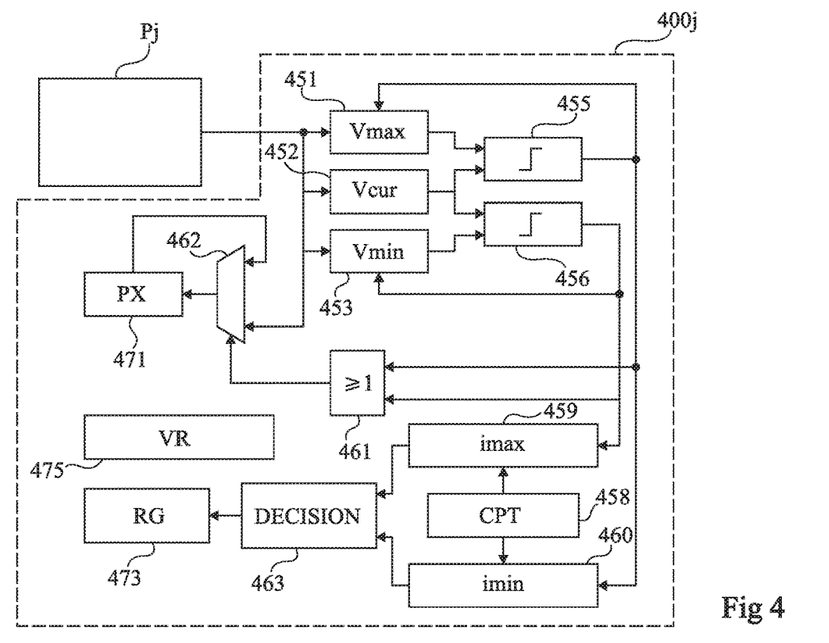
FIG. 4 schematically and partially illustrates an example of a sensor capable of acquiring a depth map of a scene and/or a fully focused image of the scene according to an embodiment.

FIG. 4 schematically and partially illustrates an example of a sensor capable of acquiring a depth map of a scene and/or a fully focused image of a scene according to an embodiment.

In FIG. 4, a single pixel $P_j$ of the sensor has been shown, as well as a circuit $400_j$ for processing the pixel output values. As an example, each of pixels $P_j$ of the sensor comprises its own processing circuit $400_j$. Processing circuit $400_j$ may be integrated to pixel $P_j$, within the pixel array, or be offset to the periphery of the pixel array, for example, at the foot or at the head of a column. As a variation, processing circuit $400_j$ may be offset outside of the sensor. Processing circuit $400_j$ may be an analog processing circuit, particularly if it is integrated in the pixel, or a digital processing circuit, in which case it may be placed downstream of a stage for digitizing the pixel output values.

Pixel $P_j$ has not been detailed, the described embodiments being compatible with all or most of known pixel structures.

Circuit $400_j$ comprises three registers 451 (Vmax) 452 (Vcur), and 453 (Vmin) connected to the output of pixel $P_j$. Circuit $400_j$ further comprises two comparators 455 and 456. Circuit $400_j$ further comprises an iteration counter 458 (CPT) and two registers 459 (imax) and 460 (imin) connected to the output of counter 458.

For each acquisition of an illumination value by pixel $P_j$, this value or current output value of the pixel, is written into register 452 (Vcur), and iteration counter 458 (CPT) is incremented. The current output value of the pixel is compared, via comparator 455, with the value contained in register 451 (Vmax) and, via comparator 456, with the value contained in register 453 (Vmin). If the current output value of the pixel is greater than the value stored in register 451 (Vmax) (or greater than the value stored in register 451 plus a predetermine fixed threshold value, for example, corresponding to a comparator offset), the value stored in register 451 (Vmax) is replaced with the current output value of the pixel, and the value stored in register 459 (imax) is replaced with the current value of iteration counter 458. Otherwise, the values stored in registers 451 (Vmax) and 459 (imax) remain unchanged. If the current output value of the pixel is greater than the value stored in register 453 (Vmin) (or greater than the value stored in register 453 minus a predetermined fixed threshold value, for example, corresponding to a comparator offset), the value stored in register 453 (Vmin) is replaced with the current output value of the pixel, and the value stored in register 460 (imin) is replaced with the current value of iteration counter 458. Otherwise, the values stored in registers 453 (Vmin) and 460 (imin) remain unchanged.

Further, each time one of the two values stored in registers 451 (Vmax) and 453 (Vmin) is updated, that is, each time one of the two comparators 455 and 456 switches state, the current output value of the pixel is written into a first output register 471 (PX). If none of the two comparators switches state, the value stored in output register 471 remains unchanged. In the shown example, to achieve this last function, circuit $400_j$ comprises an OR gate 461 and a two-input-to-one-output multiplexer 462. The OR gate receives on a first input the output signal of comparator 455 and on a second input the output signal of comparator 456. The output signal of OR gate 461 controls multiplexer 462. A first input of multiplexer 462 is connected to the output of pixel $P_j$, the second input of multiplexer 462 being connected to the output of register 471. The output of multiplexer 462 is connected to the input of register 471.

Before the first acquisition of a series of image acquisitions by the sensor, the values of registers 451 (Vmax) and 453 (Vmin) are for example respectively set to the minimum value which may be written into the register and to the maximum value which may be written into the register. Further, iteration counter 458 may be reset.

At the end of a phase of acquisition of a series of images by the sensor, register 451 (Vmax) contains the maximum value acquired for pixel $P_j$, and register 453 (Vmin) contains the minimum value acquired for pixel $P_j$. Further, register 459 (imax) contains the rank of the acquisition having generated the maximum value of pixel $P_j$, and register 460 (imin) contains the rank of the acquisition having generated the minimum value of pixel $P_j$. Further, output register 471 contains the value of the last extremum detected for the pixel, which may be either the maximum or the minimum. This value forms the final output value of the pixel which may, for example, be used for the construction of a fully focused image.

Circuit $400_j$ further comprises a logic decision circuit 463 (DECISION) capable, from the rank values stored in registers 459 and 460, of determining whether the extremum stored in output register 471 is the maximum or the minimum of the output values provided by pixel $P_j$. To achieve this, circuit 463 may compare the rank values stored in registers 459 (imax) and 460 (imin). The greatest of the two rank values correspond to the last detected extremum, and thus to the rank of the pixel value stored in output register 471. This rank value is then written by decision circuit 463 into a second output register 473 (RG). This value forms the pixel depth value, which may for example be used for the construction of a depth map of the scene.

Circuit $400_j$ further comprises a third output register 475 (VR) having a value, equal to the difference between the value stored in register 451 (Vmax) and the value stored in register 453 (Vmin) at the end of the acquisition phase, stored therein. This value forms an estimator of the likelihood of the depth value assigned to the pixel.

Figure 5:
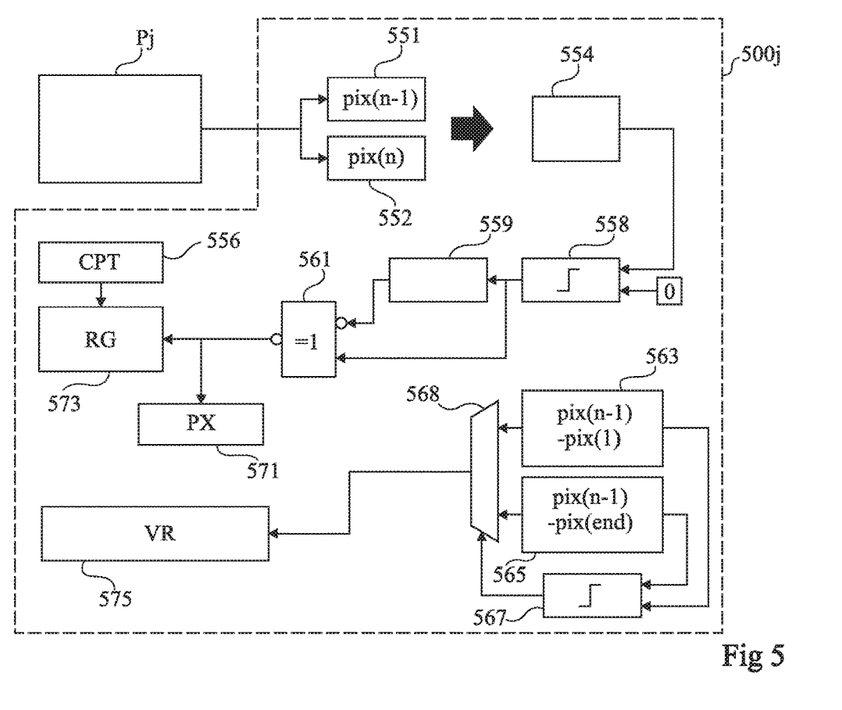
FIG. 5 schematically and partially illustrates another example of a sensor capable of acquiring a depth map of a scene and/or a fully focused image of the scene according to an embodiment.

FIG. 5 schematically and partially illustrates another example of a sensor capable of acquiring a depth map of a scene and/or a fully focused image of a scene according to an embodiment.

The sensor of FIG. 5 differs from the sensor of FIG. 4 in that, in the sensor of FIG. 5, processing circuit $400_j$ of the sensor of FIG. 4 is replaced with a processing circuit $500_j$.

Circuit $500_j$ comprises two registers 551 (pix(n-1)) and 552 (pix(n)). Circuit $500_j$ further comprises a derivation circuit 554 and an iteration counter 556 (CPT).

For each acquisition of an illumination value by pixel $P_j$, iteration counter 556 is incremented, the current output value of the pixel is written into register 552 (pix(n)), and the value previously stored in register 552 (pix(n)) is written into register 551 (pix(n-1)). The two values are transmitted to derivation circuit 554, which calculates the difference between the current output value of the pixel (stored in register 552) and the previous output value of the pixel (stored in register 551). This difference corresponds to the derivative of the pixel output value. Circuit $500_j$ further comprises a circuit for detecting an inversion of the sign of this difference. In this example, the inversion detection circuit comprises a comparator 558 comparing with zero the result of the difference calculated by derivation circuit 554. The result of the comparison is stored in a buffer or delay circuit 559. The inversion detection circuit further comprises a NAND logic gate 561 receiving on a first input the signal stored in buffer 559, corresponding to the output signal of comparator 558 with the previous iteration and, on a second input, the current output signal of comparator 558. The output signal of logic gate 561 switches to the high state when the sign of the difference calculated by derivation circuit 554 changes between two successive acquisitions of an output value of pixel $P_j$. When the output signal of logic gate 561 switches to the high state, the previous value of the pixel, contained in register 551 (pix(n-1)) is written into a first output register 571 (PX). Further, the current value of iteration counter 556 is written into a second output register 573 (RG). As a variation, the values of output registers 571 and 573 are updated only when difference pix(n)-pix(n-1) changes sign and is greater (in absolute value) than a predetermined fixed threshold value.

At the end of a phase of acquisition of a series of images by the sensor, register 571 (PX) contains the value of the pixel corresponding to the last extremum detected in the series of acquired output values of the pixel. This value forms the final output value of the pixel, which may for example be used for the construction of a fully focused image. Further, register 573 (RG) contains the rank of this extremum in the series of output values of the pixel. This value forms the pixel depth value, which may for example be used for the construction of a depth map of the scene.

During the acquisition phase, the first and last values acquired for the pixel are further stored in registers, not shown. At the end of the acquisition phase, the difference between the pixel value stored in output register 571 and the first pixel output value is calculated and written into a register 563 (pix(n-1)-pix(1)). Further, the difference between the pixel value stored in output register 571 and the last pixel output value is calculated and written into a register 565 (pix(n-1)-pix(end)). These two differences are compared with a comparator 567 and the greater of the two differences is written into a third output register 575 (VR). To achieve this, circuit $500_j$ further comprises a multiplexer 568 of two inputs (respectively connected to the output of register 563 and to the output of register 565) to one output (connected to the input of register 575), having its control connected to the output of comparator 567. The value stored in output register 575 (VR) at the end of the acquisition phase forms an estimator of the likelihood of the depth value assigned to the pixel.

An advantage of the described embodiments is the low computational complexity of the provided depth map and/or fully focused image construction method. In particular, to determine the depth value of a pixel, the provided method only takes into account variations of the pixel value in the series of 2D images acquired by the sensor, and does not take into account the output values of other sensor pixels. This significantly simplifies the implementation of the method as compared with known methods.

Specific embodiments have been described. Various alterations, modifications, and improvements will occur to those skilled in the art. In particular, the described embodiments are not limited to the above-mentioned specific examples of acquisition systems and of a sensor. More generally, any other adapted device may be used to implement the provided method of constructing a depth map of a scene and/or of a fully focused image of a scene, based on the search, for each pixel position, for an extremum in the series of values acquired for the pixel.

Further, although embodiments where the data acquired by each sensor pixel are processed on the fly, as the n 2D images are being acquired by the sensor, have been described, the described embodiments are not limited to this specific case. As a variation, all the 2D images of the series of images may be first acquired, after which the extremum search processing for each pixel position may be implemented, possibly by an external processing device.

Further, the described embodiments are not limited to the above-mentioned examples of methods of searching for an extremum in the series of values acquired for each pixel. More generally, any known extremum search method may be used. Further, for each pixel position, a preprocessing, for example, a smoothing processing, for example, a high-pass filtering, may be implemented on the series of values acquired for the pixel, prior to the search for an extremum, to decrease the sensitivity of the method to parasitic noise. It should in particular be noted that instead of searching for an extremum of the pixel value from the considered series of images, it may be provided to search for an extremum of a derivative, for example, a derivative of order n greater than or equal to 2, of the pixel value in the considered series of images.

Further, the described embodiments are not limited to the examples of calculation method of the likelihood estimator of each pixel described in relation with FIGS. 4 and 5. More generally, other likelihood estimators may be used, for example, the maximum of the absolute value of the derivative of order n of the pixel value in the series of images, or also the standard deviation of the absolute value of the derivative of order n of the pixel value in the series of images.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of generating, by means of a signal processing device, a depth map or a fully focused image of a scene, from a series of images of the scene, each comprising a same number of pixels, the images being taken under a same viewing angle but with a different focusing, the method comprising, for each position of a pixel in the series of images, the steps of:
    a) searching for an extremum of the pixel value or of a derivative of the pixel value in the series of images by only taking into account the values of the pixel at the considered position in the series of images;
    b) assigning to said position of the pixel in the series of images
       a first value which is a function of the rank, in the series of images, of the image where the extremum has been identified at step a) to construct the depth map of the scene;
    c) assigning to said position of the pixel in the series of images a third value representative of the relevance of the first value assigned to the pixel at step b), the third value being determined by only taking into account the values of the considered pixel in the series of images; and
    d) supplying an output value comprising the first value and the third value assigned to the pixel.

2. The method of claim 1, wherein the third value is representative of the dynamic range of the variation of the value of the pixel in the series of images.

3. The method of claim 2, wherein the third value is equal to the difference between the maximum value and the minimum value of the pixel in the series of images.

4. The method of claim 1, wherein the third value is representative of the dynamic range of a local variation of the value of the pixel in the series of images.

5. The method of claim 1, wherein, at step a), the search for the extremum is performed by comparing two by two the values of the pixel ($P_j$) in the consecutive images of the series of images, or by searching for a change of sign of the derivative of the value of the pixel in the series of images.

6. A signal processing device configured for generating a depth map of a scene, from a series of images of the scene, each comprising a same number of pixels, the images being taken under a same viewing angle but with a different focusing, the signal processing device being configured for implementing, for each position of a pixel in the series of images, the steps of:
    a) searching for an extremum of the pixel value or of a derivative of the pixel value in the series of images by only taking into account the values of the pixel at the considered position in the series of images;
    b) assigning to said position of the pixel in the series of images;
       a first value which is a function of the rank, in the series of images, of the image where the extremum has been identified at step a) to construct the depth map of the scene;
    c) assigning to said position of the pixel in the series of images a third value representative of the relevance of the first value assigned to the pixel at step b), the third value being determined by only taking into account the values of the considered pixel in the series of images; and
    d) supplying an output value comprising the first value and the third value assigned to the pixel.

7. A system comprising:
    an acquisition device comprising an image sensor, an optical system placed opposite the sensor, and a control circuit capable of controlling the acquisition of a series of images by the sensor by modifying on each acquisition a focus adjustment of the acquisition device; and
the signal processing device of claim 6, configured to generate the depth map of the scene seen by the sensor from the series of images acquired by the acquisition device.

8. The system of claim 7, wherein the processing device comprises, for each image sensor pixel, a processing circuit capable of identifying the extremum of the output value of the image sensor pixel from a series of successive output values supplied by the image sensor pixel.

9. The system of claim 8, wherein each processing circuit is capable of processing on the fly the output values of the image sensor pixel associated therewith.

10. The system of claim 8, wherein each processing circuit is integrated in the image sensor pixel associated therewith.

11. The method of claim 1, further comprising, at step a), assigning to said position of the pixel in the series of images a second value equal to the value of the pixel in the image where the extremum has been identified at step a) to construct the fully focused image of the scene, and wherein, at step d), the supplied output value further comprises the second value assigned to the pixel.

12. A method of generating, by means of a signal processing device, a fully focused image of a scene, from a series of images of the scene, each comprising a same number of pixels, the images being taken under a same viewing angle but with a different focusing, the method comprising, for each position of a pixel in the series of images, the steps of:
  a) searching for an extremum of the pixel value or of a derivative of the pixel value in the series of images by only taking into account the values of the pixel at the considered position in the series of images;
  b) assigning to said position of the pixel in the series of images a second value equal to the value of the pixel in the image where the extremum has been identified at step a) to construct a fully focused image of the scene;
  c) assigning to said position of the pixel in the series of images a third value representative of the relevance of the second value assigned to the pixel at step b), the third value being determined by only taking into account the values of the considered pixel in the series of images; and
  d) supplying an output value comprising the second value and the third value assigned to the pixel.

13. The method of claim 12, wherein the third value is representative of the dynamic range of the variation of the value of the pixel in the series of images.

14. The method of claim 13, wherein the third value is equal to the difference between the maximum value and the minimum value of the pixel in the series of images.

15. The method of claim 12, wherein the third value is representative of the dynamic range of a local variation of the value of the pixel in the series of images.

16. The method of claim 12, wherein, at step a), the search for the extremum is performed by comparing two by two the values of the pixel in the consecutive images of the series of images, or by searching for a change of sign of the derivative of the value of the pixel in the series of images.

17. A signal processing device configured for generating a fully focused image of a scene, from a series of images of the scene each comprising a same number of pixels, the images being taken under a same viewing angle but with a different focusing, the signal processing device being configured for implementing, for each position of a pixel in the series of images, the steps of:
  a) searching for an extremum of the pixel value or of a derivative of the pixel value in the series of images by only taking into account the values of the pixel at the considered position in the series of images;
  b) assigning to said position of the pixel in the series of images a second value equal to the value of the pixel in the image where the extremum has been identified at step a) to construct a fully focused image of the scene;
  c) assigning to said position of the pixel in the series of images a third value representative of the relevance of the second value assigned to the pixel at step b), the third value being determined by only taking into account the values of the considered pixel in the series of images; and
  d) supplying an output value comprising the second value and the third value assigned to the pixel.

18. A system comprising:
  an acquisition device comprising an image sensor, an optical system placed opposite the sensor, and a control circuit capable of controlling the acquisition of a series of images by the sensor by modifying on each acquisition a focus adjustment of the acquisition device; and
  the signal processing device of claim 17, configured to generate a fully focused image of a scene seen by the sensor from the series of images acquired by the acquisition device.

19. The system of claim 18, wherein the processing device comprises, for each image sensor pixel, a processing circuit capable of identifying the extremum of the output value of the image sensor pixel from a series of successive output values supplied by the image sensor pixel.

20. The system of claim 19, wherein each processing circuit is capable of processing on the fly the output values of the image sensor pixel associated therewith.

21. The system of claim 19, wherein each processing circuit is integrated in the image sensor pixel associated therewith.

* * * * *